(12) United States Patent
Kato et al.

(10) Patent No.: US 8,137,848 B2
(45) Date of Patent: Mar. 20, 2012

(54) METHOD FOR PRODUCING DIFLUOROPHOSPHATE, NONAQUEOUS ELECTROLYTE SOLUTION FOR SECONDARY BATTERIES, AND NONAQUEOUS ELECTROLYTE SECONDARY BATTERY

(75) Inventors: Ryoichi Kato, Inashiki-gun (JP); Hitoshi Suzuki, Inashiki-gun (JP)

(73) Assignee: Mitsubishi Chemical Corporation, Tokyo (JP)

( * ) Notice: Subject to any disclaimer, the term of this patent is extended or adjusted under 35 U.S.C. 154(b) by 0 days.

(21) Appl. No.: 13/053,874

(22) Filed: Mar. 22, 2011

(65) Prior Publication Data
US 2011/0171519 A1 Jul. 14, 2011

Related U.S. Application Data

(62) Division of application No. 11/577,466, filed as application No. PCT/JP2005/019105 on Oct. 18, 2005, now Pat. No. 8,076,033.

(30) Foreign Application Priority Data

Oct. 19, 2004 (JP) ................. 2004-304487

(51) Int. Cl.
*H01M 6/14* (2006.01)
*H01M 6/16* (2006.01)
(52) U.S. Cl. ......... 429/332; 429/199; 429/338; 429/342
(58) Field of Classification Search .................. 423/301; 429/199, 332, 338, 342
See application file for complete search history.

(56) References Cited

U.S. PATENT DOCUMENTS

| | | | | | |
|---|---|---|---|---|---|
| 2,846,412 | A | * | 8/1958 | Havens | ......................... 524/415 |
| 5,393,506 | A | * | 2/1995 | Swidersky et al. | ........... 423/301 |
| 6,210,830 | B1 | * | 4/2001 | Sartori et al. | ................. 429/199 |
| 2008/0305402 | A1 | | 12/2008 | Kato et al. | |
| 2009/0286155 | A1 | | 11/2009 | Takehara | |

FOREIGN PATENT DOCUMENTS

| | | |
|---|---|---|
| JP | 58-181710 | 10/1983 |
| JP | 10-144345 | 5/1998 |
| JP | 11-67270 | 3/1999 |
| JP | 3439085 | 6/2003 |
| JP | 2004-31079 | 1/2004 |

OTHER PUBLICATIONS

English translation of JP 2004-31079 published on Jan. 29, 2004.*
Vast, et al., "Methodological study of the synthesis of metal difluorodioxophosphates from phosphoryl difluoride oxide", Journal of Fluorine Chemistry, 38 (1998) 297-302 (w/English translation).
Thompson, et al., Inorganic Nucl. Chem. Letters vol. 5, pp. 581-585, 1969, "Preparation and infrared spectra of alkali metal difluorophosphates", Department of Chemistry, University of British Columbia, Vancouver, B.C., Canada.
Kongpricha, et al., "The Preparation and Some Reactions of Phosphoramidic Difluoride", vol. 6, No. 10, Oct. 1967, pp. 1915-1917.
Office Action mailed May 8, 2009, in Japanese Patent Application No. 2004-304487, filed on Oct. 19, 2004.
International Search Report mailed Jan. 31, 2006, in PCT/JP2005/019105 filed Oct. 18, 2005.

* cited by examiner

*Primary Examiner* — Wayne Langel
(74) *Attorney, Agent, or Firm* — Oblon, Spivak, McClelland, Maier & Neustadt, L.L.P

(57) ABSTRACT

The present invention provides a simple method for producing a difluorophosphate from a source material, the difluorophosphate being useful as additives for nonaqueous electrolyte solutions for secondary batteries. In the method, a source material containing a carbonate and/or a borate is allowed to react with a source gas which contains P and F and which may further contain O as required. The source material may contain lithium carbonate. The source gas may be produced by decomposing $LiPF_6$. The source gas may be produced in such a manner that $LiPF_6$ and lithium carbonate are mixed and then subjected to reaction. The nonaqueous electrolyte solution contains the product obtained from the reaction.

23 Claims, No Drawings

METHOD FOR PRODUCING DIFLUOROPHOSPHATE, NONAQUEOUS ELECTROLYTE SOLUTION FOR SECONDARY BATTERIES, AND NONAQUEOUS ELECTROLYTE SECONDARY BATTERY

CROSS REFERENCE TO RELATED APPLICATION

This application is a divisional application of U.S. application Ser. No. 11/577,466, filed on Nov. 28, 2007, which is a 371 of PCT/JP05/019105, filed on Oct. 18, 2005, and claims priority to Japanese Patent Application No. 2004-304487, filed on Oct. 19, 2004.

TECHNICAL FIELD

The present invention relates to a method for producing a difluorophosphate, a nonaqueous electrolyte solution for secondary batteries, and a nonaqueous electrolyte secondary battery.

BACKGROUND ART

Secondary batteries contain nonaqueous electrolyte solutions. The nonaqueous electrolyte solutions contain nonaqueous solvents such as cyclic carbonates such as ethylene carbonate and propylene carbonate; linear carbonates such as dimethyl carbonate, diethyl carbonate, and ethyl methyl carbonate; cyclic esters such as γ-butyrolactone and γ-valerolactone; linear esters such as methyl acetate and methyl propionate; cyclic ethers such as tetrahydrofuran, 2-methyl tetrahydrofuran, and tetrahydropyran; linear ethers such as dimethoxyethane and dimethoxymethane; and sulfur-containing organic solvents such as sulfolane and diethyl sulfone and also contain electrolytes, such as $LiPF_6$, $LiBF_4$, $LiClO_4$, $LiCF_3SO_3$, $LiAsF_6$, $LiN(CF_3SO_2)_2$, and $LiCF_3(CF_2)_3SO_3$, dissolved in such nonaqueous solvents.

Patent Document 1 cited below discloses that difluorophosphates are useful as stabilizers for polychloroethylene. Patent Documents 2 and 3 cited below disclose that the difluorophosphates are useful as additives for nonaqueous electrolyte solutions for lithium secondary batteries. However, Patent Document 3 also discloses that a battery containing a mixture of lithium difluorophosphate and lithium monofluorophosphate has properties inferior to those of a battery containing lithium difluorophosphate. Therefore, it has not been clear that what kind of difluorophosphate is preferred and advantages of the difluorophosphates and conditions for using the difluorophosphates also have not been clear.

Non-patent Documents 1 and 2 disclose methods for producing the difluorophosphates by the reaction of $P_2O_3F_4$ with metal salts or $NH_3$. Non-patent Document 3 discloses that the difluorophosphates are produced by the reaction of difluorophosphoric acid with metal salts.

Patent Document 1: U.S. Pat. No. 2,846,412
Patent Document 2: Japanese Patent No. 3439085
Patent Document 3: Japanese Unexamined Patent Application Publication No. 2004-31079
Non-patent Document 1: J. Fluorine Chem. (1988), 38 (3), 297
Non-patent Document 2: Inorganic Chemistry (1967), 6 (10), 1915
Non-patent Document 3: Inorganic Nuclear Chemistry Letters (1969), 5 (7), 581

$P_2O_3F_4$, which is a source material used in the methods described in Non-patent Documents 1 and 2, is not readily available and is very expensive. The difluorophosphates produced by the methods need to be separated from by-products and then purified.

High-purity difluorophosphoric acid used in the method described in Non-patent Document 3 is not readily available. In this method, many steps need to be performed in the absence of moisture.

SUMMARY OF THE INVENTION

According to a first aspect of the present invention, a source gas which contains P and F and which may further contain O is brought into contact with a source material containing a carbonate and/or a borate, whereby a difluorophosphate is produced.

According to a second aspect of the present invention, $LiPF_6$ is mixed with a source material containing a carbonate and/or a borate and the mixture is heated, whereby a difluorophosphate is produced.

A third aspect of the present invention provides a difluorophosphate composition having a $PO_2F_2$ content of 20 to 65 weight percent, a $PO_3F$ content of one weight percent or less, and a $PO_4$ content of one weight percent or less on the basis of the difference obtained by subtracting the weight of a metal element from the total weight.

A fourth aspect of the present invention provides a nonaqueous electrolyte solution, for secondary batteries, containing a nonaqueous solvent and an electrolyte lithium salt containing a hexafluorophosphate and a difluorophosphate. A portion of the difluorophosphate is at least one selected from the group consisting of a difluorophosphate produced by the method according to the first or second aspect and/or the difluorophosphate composition according to the third aspect.

A fifth aspect of the present invention provides a nonaqueous electrolyte solution, for secondary batteries, containing a nonaqueous solvent and an electrolyte lithium salt containing a hexafluorophosphate, a difluorophosphate, and a fluoride.

A sixth aspect of the present invention provides a nonaqueous electrolyte solution, for secondary batteries, containing a nonaqueous solvent and an electrolyte lithium salt containing a hexafluorophosphate, difluorophosphate, and carbon dioxide.

A seventh aspect of the present invention provides a nonaqueous electrolyte solution, for secondary batteries, containing a nonaqueous solvent and an electrolyte lithium salt containing a hexafluorophosphate and lithium difluorophosphate. The nonaqueous solvent contains a cyclic carbonate and a linear carbonate and is a solvent mixture of three or more types of nonaqueous solvent components.

An eight aspect of the present invention provides a nonaqueous electrolyte secondary battery including a nonaqueous electrolyte solution, a negative electrode that can be inserted and deserted lithium ions, and a positive electrode. The nonaqueous electrolyte solution is as specified in the fourth, fifth, sixth, or seventh aspect.

A ninth aspect of the present invention provides a nonaqueous electrolyte secondary battery including a nonaqueous electrolyte solution, a negative electrode that can be inserted and deserted lithium ions, and a positive electrode. The nonaqueous electrolyte solution is as specified in the fourth, fifth, sixth, or seventh aspect. At least one of the following conditions is satisfied:

(i) the sum of the electrode areas of the positive electrode is 20 times or more greater than the surface area of a cover of the secondary battery;

(ii) the secondary battery has a direct current resistance of less than ten milliohms (mΩ); and (iii) the electrical capacity of a battery cell housed in a battery cover of the secondary battery is three ampere-hours (Ah) or more.

PREFERRED EMBODIMENTS OF THE INVENTION

According to the present invention, a difluorophosphate can be readily produced from a source material which is inexpensive and readily available.

The difluorophosphate produced is an extremely useful additive for nonaqueous electrolyte solutions for secondary batteries. Nonaqueous electrolyte solutions and secondary batteries containing the difluorophosphate have superior properties.

Embodiments of the present invention will now be described. The present invention is not limited to the embodiments. Various modifications may be made within the scope of the present invention.
(Method for Producing Difluorophosphate and Difluorophosphate Composition)

A method for producing a difluorophosphate according to a preferred embodiment of the present invention and a difluorophosphate composition according to a preferred embodiment of the present invention will now be described.

In the producing method according to the present invention, a source material containing a carbonate and/or a borate is brought into contact with and allowed to react with a source gas containing a phosphorus compound that contains P and F and may further contain O as required.

Details of the reaction mechanism are not sufficiently clear. When the phosphorus compound is $PF_5$ and the source material contains lithium carbonate ($Li_2CO_3$), the reaction represented by the following formula probably occurs:

$$PF_5 + 2Li_2CO_3 \rightarrow LiPO_2F_2 + 3LiF + 2CO_2$$

As shown in the reaction formula, 1 mol of $PF_5$ theoretically reacts with 2 mol of lithium carbonate. Lithium difluorophosphate ($LiPO_2F_2$) produced is solid at room temperature. Lithium difluorophosphate, which is a target product, is obtained in the form of a mixture containing lithium carbonate contained in the source material and lithium fluoride, which is a by-product. Lithium difluorophosphate can be separated from the mixture or purified by a technique such as recrystallization.

Lithium difluorophosphate can be used as additives for electrolyte solutions for secondary batteries as described above. LiF, which is a by-product of the reaction, is a substance allowed to be present in batteries. Therefore, the product obtained from the reaction can be used as additives for such electrolyte solutions without purification.

Preferred raw materials and reaction conditions suitable for the producing method according to the present invention will now be described in detail.
(Source Material)

The carbonate and/or borate contained in the source material is not particularly limited and may be a compound reactive with the source gas described below. The carbonate and/or the borate is usually selected from the group consisting of alkali metal salts, alkaline-earth metal salts, and $NR^1R^2R^3R^4$ salts, wherein $R^1$ to $R^4$ may be the same or different from each other and represent hydrogen atoms or organic groups with one to twelve carbon atoms.

The alkali metal is usually selected from the group consisting of Li, Na, K, Rb, and Cs. In particular, Li, Na, and K are preferable because of its cost and availability and Li and K are more preferable. The alkaline-earth metal is usually selected from the group consisting of Be, Mg, Ca, Sr, and Ba. In particular, Mg, Ca, Sr, and Ba are preferable because of its cost and safety and Ca is more preferable. Examples of the organic groups represented by from each other and represent hydrogen atoms or organic groups with one to twelve carbon atoms) include alkyl groups such as a methyl group, an ethyl group, a propyl group, and a butyl group; cycloalkyl groups such as a cyclohexyl group; and nitrogen-containing heterocyclic groups such as a piperidyl group, a pyrrolidyl group, a pyridyl group, and an imidazolyl group. In particular, such a methyl group and an ethyl group are preferable. Preferred examples of $NR^1R^2R^3R^4$ include a tetraethylammonium group and a triethylmethylammonium group.

In particular, a lithium salt is preferable because of its reactivity.

The borate may be any one of an orthoborate, a metaborate, a diborate, a tetraborate, a pentaborate, and an octaborate. Borates with a high O to B ratio are preferable. In particular, such an orthoborate, a metaborate, and a tetraborate are preferable. The borate is not limited to these borates.

In order to prevent the difluorophosphate produced from being contaminated with acidic impurities, the source material preferably contains an anhydride.

The source material may contain one or more carbonates, one or more borates, or a mixture of one or more carbonates and one or more borates.

When the carbonate and the borate have a small particle size, they have high reactivity. However, when the particle size thereof is extremely fine, particles thereof are readily airborne. Therefore, the average particle size of the carbonate and the borate is preferably 0.01 μm or more and more preferably 0.1 μm or more and is also preferably 100 μm or less and more preferably 20 μm or less. Extremely fine particles are readily airborne and powder with a large particle size has low reactivity.
(Source Gas)

The phosphorus compound contained in the source gas contains P and F and may further contain O as required. The phosphorus compound has reactivity with the carbonate and/or the borate. The phosphorus compound preferably consists of P and F or consists of P, F, and O. The ratio of P to F to O in the phosphorus compound is not particularly limited. Since the ratio of P to F in the difluorophosphate is equal to 1:2, the ratio of P to F in the phosphorus compound preferably ranges from 1:2 to 1:5. Since the ratio of P to O in the difluorophosphate is equal to 1:2, the ratio of P to O in the phosphorus compound preferably ranges from 1:0 to 1:2.

The phosphorus compound is preferably $PF_5$ or $POF_3$. $PF_5$ is particularly preferable. One type of phosphorus compound may be used alone or two or more types of phosphorus compounds may be used in combination.

The molecular weight of the phosphorus compound is preferably 80 or more and more preferably 90 or more and is also preferably 200 or less and more preferably 150 or less. When the phosphorus compound has a molecular weight of 80 or more, the phosphorus compound is usually solid at room temperature. When the source gas contains two or more types of phosphorus compounds, the molecular weight of these phosphorus compounds corresponds to the apparent molecular weight calculated from the molecular weight and content of each gas.

A method for preparing the phosphorus compound is not particularly limited. $PF_5$ can be produced in such a manner that a phosphoric compound such as $PCl_5$ is allowed to react with HF such that ligands thereof are exchanged or in such a manner that a phosphorous compound such as $PCl_3$ is oxidized and the oxide produced is allowed to react with HF such that ligands thereof are exchanged. Alternatively, $PF_5$ can be produced in such a manner that $LiPF_6$ is thermally decomposed at 50° C. or higher.

In the case where $LiPF_6$ is subjected to thermal decomposition, the average particle size of $LiPF_6$ is preferably 0.1 μm or more and more preferably 1 μm or more and is also preferably 500 μm or less and more preferably 300 μm or less. An extremely fine powder is airborne and absorbs moisture and a powder with an extremely large particle size has low reactivity.

(Ratio of Source Material to Source Gas)

The loading ratio of the source material to the source gas is preferably calculated from the theoretical amount necessary to produce the difluorophosphate depending on a method for producing the difluorophosphate. If an excessive amount of the source gas is used, the amount of the source gas used is preferably 20 times or less and more preferably ten times or less of the theoretical amount thereof. If an excessive amount of the source material, which is solid, is used, the amount of the source material used is preferably five times or less and more preferably three times or less of the theoretical amount thereof.

(Reaction)

The source material is brought into contact with and allowed to react with the source gas. The reaction system may be heated. After the solid source material is loaded into a reaction vessel and the source gas is then introduced into the reaction vessel, the reaction vessel may be heated. Alternatively, after the solid source material is loaded into the reaction vessel, the reaction vessel may be heated while the source gas is being introduced into the reaction vessel or being fed through the reaction vessel. The solid source material may be fed to the heated reaction vessel while the source gas is being fed through the reaction vessel. After the solid source material is loaded into the reaction vessel and the source gas is then introduced into the reaction vessel, the reaction vessel may be operated in such a manner that the reaction vessel is heated for a predetermined time and then cooled, the source gas is removed from the reaction vessel by decompression or by the use of an inert gas, the source gas is introduced into the reaction vessel again, and the reaction vessel is then heated.

The contact of the source material with the source gas may be carried out in a solvent. In this case, the source gas may be introduced into the reaction vessel containing the solid source material and the solvent. The solvent is preferably nonaqueous one as described below.

A technique for introducing the source gas into the solvent is not particularly limited. Examples of such a technique include a technique for bring the source gas into contact with the surface of a liquid in the reaction vessel and a technique for directly introducing the source gas into a liquid to bubble the liquid. In any technique, the solid source material is preferably mixed with the solvent.

The following technique may be used: a technique in which the carbonate and/or borate contained in the solid source material is mixed with solid $LiPF_6$ at room temperature, the mixture is heated, and the source gas containing the phosphorus compound generated from $LiPF_6$ is then allowed to react with the carbonate and/or borate. This technique has high reaction efficiency and yield.

In this technique in which the mixture of the carbonate and/or borate and $LiPF_6$ is heated, the carbonate and/or borate may be preheated. The preheating temperature thereof is preferably about 40-50° C. $LiPF_6$ may be also preheated. The preheating temperature thereof is preferably about 30-50° C.

The reactor may be a batch or continuous system. The reaction vessel is preferably equipped with a vertical or horizontal shaft having a vane or a roller because the reaction can be conveniently carried out.

Reaction conditions such as the temperature, time, and pressure of the reaction are not particularly limited and may be appropriately selected according to the circumstances. The reaction conditions are preferably as described below.

The reaction temperature is not particularly limited and may be sufficiently high to carry out the reaction. The reaction temperature is preferably higher than room temperature because the rate of the reaction is high. In particular, the reaction temperature is preferably 20° C. or more, more preferably 30° C. or more, and further more preferably 40° C. or more and is also preferably 200° C. or less and more preferably 180° C. When the reaction temperature is lower than 20° C., the reaction does not proceed easily. When the reaction temperature is higher than 200° C., the difluorophosphate is probably decomposed. In case the reaction is carried out by thermally decomposition of $LiPF_6$, the temperature at which $LiPF_6$ is thermally decomposed is preferably 50° C. or more and more preferably 60° C. or more and is also preferably 200° C. or less and more preferably 180° C. or less. When the reaction temperature is low, the reaction time needs to be long.

The reaction pressure is preferably 0.01 MPa or more and more preferably 0.05 MPa or more and is also preferably 10 MPa or less and more preferably 1 MPa or less.

The reaction time depends on the reaction temperature, the reaction pressure, and the loading amount of the raw materials. If the source gas is repeatedly introduced into the reaction vessel, the reaction time depends on the number of times the source gas is introduced thereinto. If the source gas is fed through the reaction vessel, the reaction time depends on the feed rate of the source gas. The reaction time is usually 1-300 hours.

For the sake of reactivity and safety, before the source gas is introduced into the reaction vessel or after the reaction is finished, the reaction vessel is preferably maintained under vacuum or filled with an inert gas. During the reaction, an atmosphere (vapor phase) in the reaction vessel preferably substantially contains the source gas only or contains the source gas and an inert gas such as $N_2$ or Ar only. When the source material contains the carbonate, $CO_2$ is generated due to the reaction. This causes no problem, because $CO_2$ is inert.

The reaction product may be withdrawn from the reactor as described below. If the reactor is operated in a batch mode, the reaction product may be withdrawn from a lower or upper portion of the reactor or the reaction product may be withdrawn from the reactor after the reactor is turned upside down. If the reactor is operated in a continuous mode, the reaction product is continuously withdrawn from the reactor using a conveyer or a screw feeder while the reaction is being carried out. Before the reaction product is withdrawn from the reactor, the atmosphere in the reactor is preferably filled with an inert gas.

In the producing method according to the present invention, the following technique may be used: so-called one-pot synthesis in which after a reactant is fed to a reaction system, a target difluorophosphate is synthesized without withdrawing a reaction intermediate or the like. If such one-pot synthesis is performed in a batch mode, the reaction may be carried out in, for example, a single reaction vessel.

Since the reaction vessel is filled with the source gas or the source gas is fed through the reaction vessel, the reaction vessel needs to have high airtightness and to be resistant to the above reaction pressure. It is not preferable that the reaction vessel is designed to endure conditions far severer than actual conditions of the reaction in view of facilities. The reaction vessel is preferably designed to endure appropriately selected reaction conditions.

A material for forming the reaction vessel needs to be resistant to (needs to be not corroded by) the source gas at a predetermined reaction temperature on condition that moisture, oxygen, and substances other than the source material are not present. Examples of such a material include stainless steels; exotic metals, such as Monel and Inconel, resistant to fluorine; and resins such as PFA (perfluoroalkoxy fluorocarbon resin) and PTFE (polytetrafluoroethylene).

The reaction product is a mixture of the difluorophosphate and by-products such as lithium fluoride or a mixture of the difluorophosphate, such by-products, and the source material if an excessive amount of the source material is used. The difluorophosphate may be separated from the reaction product by recrystallization or the like as required and then purified.

(Difluorophosphate Composition)

The difluorophosphate produced by the producing method according to the present invention is contained in a difluorophosphate composition that preferably has the content (the content (weight percent) of each component on the basis of the difference (hereinafter referred to as "non-metal component weight" in some cases) obtained by subtracting the weight of a metal element from the total weight) specified in Item (1) or (2) below and more preferably Item (3) or (4) below.

(1) A $PO_2F_2$ content raging from 20 to 65 weight percent of the non-metal component weight.

(2) A $PO_3F$ content and $PO_4$ content less than or equal to one weight percent of the non-metal component weight.

(3) A $PF_6$ content raging from zero to 70 weight percent of the non-metal component weight.

(4) An F content raging from 10 to 40 weight percent of the non-metal component weight (the ratio of the $PO_2F_2$ content to the F content being 1:0.15 to 1:0.85 (on a weight basis)) and a $BF_4$ content raging from 15 to 60 weight percent of the non-metal component weight (the ratio of the $PO_2F_2$ content to the $BF_4$ content being 1:0.3 to 1:2 (on a weight basis)) if the borate is contained in the source material.

The difluorophosphate composition can be produced by the producing method according to the present invention and is characteristic of the present invention.

[2] Nonaqueous Electrolyte Solution for Secondary Batteries

A nonaqueous electrolyte solution, according to the present invention, for secondary batteries will now be described.

The nonaqueous electrolyte solution contains a nonaqueous solvent and an electrolyte lithium salt containing a hexafluorophosphate and the difluorophosphate.

The difluorophosphate is produced by the producing method according to the present invention or is contained in the difluorophosphate composition.

In the producing method according to the present invention, the difluorophosphate may be isolated from the reaction product obtained by the reaction of lithium difluorophosphate with the carbonate. The hexafluorophosphate can be used as additives for secondary battery-use nonaqueous electrolyte solutions. If the reaction product, obtained by the reaction of lithium hexafluorophosphate with the carbonate, containing the difluorophosphate is directly added to the nonaqueous solvent, a separation step and a purification step can be omitted.

As described above, the reaction product is the mixture of the difluorophosphate and by-products such as lithium fluoride or the mixture of the difluorophosphate, such by-products, and the source material if an excessive amount of the source material is used. If the source material contains, for example, lithium carbonate and a source for producing the source gas is lithium hexafluorophosphate ($LiPF_6$), the reaction product contains lithium difluorophosphate produced, lithium fluoride which is a by-product, carbon dioxide which is a by-product, residual lithium hexafluorophosphate, and residual lithium carbonate. If the nonaqueous electrolyte solution is prepared directly using the reaction product, the nonaqueous electrolyte solution contains the nonaqueous solvent, the hexafluorophosphate, the difluorophosphate, the fluoride, and carbon dioxide.

In the producing method according to the present invention, if the contact of the source material (the carbonate) with the source gas ($PF_5$) is carried out in the nonaqueous solvent and thereby a reaction solution is prepared, the nonaqueous electrolyte solution of the present invention can be prepared by adding an electrolyte lithium salt described below to the reaction solution.

Components of the nonaqueous electrolyte solution of the present invention and the content of the components in the nonaqueous electrolyte solution are preferably as described below even if the nonaqueous electrolyte solution is prepared in such a manner that the reaction product produced by the producing method of the present invention is added to the nonaqueous solvent or the reaction solution, which is prepared in such a manner that the contact of the source material (the carbonate) with the source gas ($PF_5$) is carried out in the nonaqueous solvent, is used.

(Nonaqueous Solvent)

Examples of the nonaqueous solvent in the nonaqueous electrolyte solution according to the present invention include cyclic carbonates such as ethylene carbonate, propylene carbonate, and butylene carbonate; linear carbonates such as dimethyl carbonate, diethyl carbonate, and ethyl methyl carbonate; cyclic esters such as γ-butyrolactone and γ-valerolactone; linear esters such as methyl acetate and methyl propionate; cyclic ethers such as tetrahydrofuran, 2-methyl tetrahydrofuran, and tetrahydropyran; linear ethers such as dimethoxyethane and dimethoxymethane; and sulfur-containing organic solvents such as sulfolane and diethyl sulfone. These solvents may be used alone or in combination.

The nonaqueous solvent is preferably a solvent mixture that contains 20 volume percent or more of a cyclic carbonate selected from the group consisting of alkylene carbonates having alkylene groups with two to four carbon atoms and 20 volume percent or more of a linear carbonate selected from the group consisting of dialkyl carbonates having alkyl groups with one to four carbon atoms, the cyclic carbonate and linear carbonate content of the nonaqueous solvent being 70 volume percent or more. This is because good charge and discharge properties, long battery life, and good battery properties can be achieved.

Examples of such alkylene carbonates having alkylene groups with two to four carbon atoms include ethylene carbonate, propylene carbonate, and butylene carbonate. In particular, ethylene carbonate and propylene carbonate are preferable.

Examples of such dialkyl carbonates having alkyl groups with one to four carbon atoms include dimethyl carbonate, diethyl carbonate, di-n-propyl carbonate, ethyl methyl carbonate, methyl n-propyl carbonate, and ethyl n-propyl carbonate. In particular, dimethyl carbonate, diethyl carbonate, and ethyl methyl carbonate are preferable.

The nonaqueous solvent, which contains the cyclic carbonate and the linear carbonate, may further contain a solvent other than carbonates. The nonaqueous solvent may contain 30 weight percent or less, preferably 10 weight percent or less, of a solvent other than carbonates such as the cyclic carbonate and the linear carbonate as long as battery properties are deteriorated.

The nonaqueous solvent is preferably a solvent mixture which contains the cyclic carbonate and the linear carbonate and which consisting of three or more types of nonaqueous solvent components because such a solvent mixture is hardly solidified at low temperature. In this case, nonaqueous electrolyte solution containing the difluorophosphate preferably further contains a linear carbonate with low molecular weight. This is because when secondary batteries contain the nonaqueous electrolyte solution, difluorophosphate anions approach positive electrodes and attract Li ions and therefore the secondary batteries have enhanced low-temperature discharge properties.

Combinations of solvents are preferably as specified in Items (1) to (3) below.

(1) A combination of ethylene carbonate (EC), dimethyl carbonate (DMC), and diethyl carbonate (DEC).

(2) A combination of ethylene carbonate (EC), dimethyl carbonate (DMC), and ethyl methyl carbonate (EMC).

(3) A combination of ethylene carbonate (EC), ethyl methyl carbonate (EMC), and diethyl carbonate (DEC).

In particular, the following combinations are preferable: the combination of ethylene carbonate (EC), dimethyl carbonate (DMC), and diethyl carbonate (DEC) and the combination of ethylene carbonate (EC), dimethyl carbonate (DMC), and ethyl methyl carbonate (EMC).

The nonaqueous solvent may contain the following four solvents: ethylene carbonate (EC), dimethyl carbonate (DMC), ethyl methyl carbonate (EMC), and diethyl carbonate (DEC)

(Electrolyte Lithium Salt)

The nonaqueous electrolyte solution according to the present invention preferably contains lithium hexafluorophosphate ($LiPF_6$) that is a type of electrolyte lithium salt. The nonaqueous electrolyte solution may further contain a lithium salt in addition to lithium hexafluorophosphate. Such a lithium salt may be at least one selected from the group consisting of inorganic lithium salts such as $LiClO_4$, $LiBF_4$, $LiAsF_6$, and $LiSbF_6$ and organic lithium salts such as $LiCF_3SO_3$, $LiN(CF_3SO_2)_2$, $LiN(CF_3CF_2SO_2)_2$, $LiN(CF_3SO_2)(C_4F_9SO_2)$, and $LiC(CF_3SO_2)_3$. In particular, $LiClO_4$ and $LiBF_4$ are preferable.

The concentration of the electrolyte lithium salt in the nonaqueous electrolyte solution is preferably 2 mol/L or less and more preferably 1.5 mol/L or less and is also preferably 0.5 mol/L or more and more preferably 0.7 mol/L or more because of the electrical conductivity and viscosity of the nonaqueous electrolyte solution.

(Difluorophosphate)

The difluorophosphate contained in the nonaqueous electrolyte solution of the present invention is one produced by the producing method according to the present invention or one derived from the source material used in the producing method according to the present invention. The difluorophosphate is preferably selected from the group consisting of alkali metal salts, alkaline-earth metal salts, and $NR^1R^2R^3R^4$ salts, wherein $R^1$ to $R^4$ may be the same or different from each other and represent hydrogen atoms or organic groups with one to twelve carbon atoms. These salts may be used alone or in combination.

The concentration of the difluorophosphate in the nonaqueous electrolyte solution is preferably $1\times10^{-3}$ mol/kg or more, more preferably $3\times10^{-3}$ mol/kg or more, and further more preferably $1\times10^{-2}$ mol/kg or more and is also preferable 0.5 mol/kg or less, more preferably 0.3 mol/kg or less, and further more preferably 0.15 mol/kg or less. When the concentration is above this range, the nonaqueous electrolyte solution has high viscosity. When the concentration is below the lower limit, it is difficult to achieve good cycle properties.

If the reaction product produced by the reaction of lithium hexafluorophosphate with the carbonate is used to prepare the nonaqueous electrolyte solution, the nonaqueous electrolyte solution can contain the carbonate. The concentration of the carbonate in the nonaqueous electrolyte solution is preferably $1\times10^{-3}$ mol/kg or less and more preferably $8\times10^{-4}$ mol/kg or less. The lower limit of the carbonate concentration is not particularly limited and may be about $5\times10^{-4}$ mol/kg. Exceeding the upper limit thereof does not impair advantages of the present invention but increases waste. This leads to a reduction in efficiency.

(Additive)

The nonaqueous electrolyte solution of the present invention may further contain any amount of additives.

Examples of such additives include overcharge protection agents such as cyclohexylbenzene and biphenyl; negative electrode film-forming agents such as vinylene carbonate, vinylethylene carbonate, fluoroethylene carbonate, and succinic anhydrides; and positive electrode-protecting agents such as ethylene sulfite, propylene sulfite, dimethyl sulfite, propane sultone, butane sultone, methyl methanesulfonate, methyl toluenesulfonate, dimethyl sulfate, ethylene sulfate, sulfolane, dimethyl sulfone, diethyl sulfone, dimethyl sulfoxide, diethyl sulfoxide, tetramethylene sulfoxide, diphenyl sulfide, thioanisole, diphenyl disulfide, and dipyridinium disulfide.

In the present invention, the difluorophosphate composition or reaction solution produced by the reaction of lithium hexafluorophosphate with the carbonate can be used to prepare the nonaqueous electrolyte solution as described above. The nonaqueous electrolyte solution can be arbitrarily designed using an appropriate solvent, an appropriate electrolyte, and the above additive.

[3] Nonaqueous Electrolyte Secondary Battery

A nonaqueous electrolyte secondary battery according to the present invention will now be described.

The nonaqueous electrolyte secondary battery comprises the nonaqueous electrolyte solution according to the present invention, a negative electrode that can be inserted and deserted lithium ions, and a positive electrode.

An active material for forming the negative electrode of the nonaqueous electrolyte secondary battery is not particularly limited and may be one that can be inserted and deserted lithium ions. Examples of the negative electrode active material include pyrolytic products obtained by thermally decomposing organic substances under various conditions, artificial graphites, and natural graphites. In particular, the following materials are preferable: artificial graphites obtained by the high-temperature heat treatment of graphitizable pitches obtained from various raw materials, refined natural graphites, and materials obtained by surface-treating these graphites using pitch or the like.

These graphite materials preferably have a d value (interlayer distance) of 0.335-0.34 nm and more preferably 0.335-0.337 nm as determined by analyzing a lattice plane (the (002) plane) of each graphite material by X-ray diffractometry according to the Gakushin method.

These graphite materials preferably have an ash content of one weight percent or less, more preferably 0.5 weight percent or less, and most preferably 0.1 weight percent or less and also preferably have a crystallite size (Lc) of 30 nm or more as determined by X-ray diffractometry according to the Gakushin method.

These graphite materials more preferably have a crystallite size (Lc) of 50 nm or more and most preferably 100 nm or more.

These graphite materials preferably have a median diameter of 1-100 μm, more preferably 3-50 μm, further more preferably 5-40 μm, and still further more preferably 7-30 μm as determined by a laser diffraction/scattering method.

These graphite materials preferably have a specific surface area of 0.5-25.0 $m^2$/g, more preferably 0.7-20.0 $m^2$/g, further more preferably 1.0-15.0 $m^2$/g, and still further more preferably 1.5-10.0 $m^2$/g as determined by the BET method.

These graphite materials have a peak $P_A$ (peak intensity $I_A$) ranging from 1580 to 1620 $cm^{-1}$ and a peak $P_B$ (peak intensity $I_B$) ranging from 1350 to 1370 $cm^{-1}$ as determined by Raman spectroscopy using an argon laser beam. The intensity ratio of the 1350-1370 $cm^{-1}$ peak to the 1580-1620 $cm^{-1}$ peak is preferably 0-0.5 as calculated using the equation $R=I_B/I_A$. The 1580-1620 $cm^{-1}$ peak preferably has a half width of 26 $cm^{-1}$ or less and the 1580-1620 $cm^{-1}$ peak preferably has a half width of 25 $cm^{-1}$ or less.

The negative electrode active material is preferably a graphite-amorphous carbon composite prepared by mixing a graphite material with an amorphous material or a graphite-amorphous carbon composite prepared by coating the graphite material with the amorphous material.

Examples of a technique for combining the graphite material with the amorphous material are as follows: a technique in which a carbon precursor for forming the amorphous material is mixed with a graphite powder, the mixture is heat-treated and then pulverized, and thereby a composite powder is obtained; a technique in which the amorphous material is pulverized into powder in advance, the amorphous material powder is mixed with a graphite powder, and the mixture is heat-treated such that a composite material is obtained; a technique in which the amorphous material is pulverized into powder in advance, the amorphous material powder is mixed with a graphite powder and the carbon precursor, and the mixture is heat-treated such that a composite material is obtained; and other techniques.

In the latter two techniques, particles of the amorphous material preferably have an average size one tenth or less of that of particles of the graphite material.

A mixture of the graphite material particles and the carbon precursor or a mixture of the graphite material particles, the carbon precursor, and the amorphous material particles is heated and thereby an intermediate is prepared. The intermediate is carbonized by calcination and then pulverized, whereby powder of the graphite-amorphous carbon composite is obtained. The percentage of a moiety derived from the amorphous material in the graphite-amorphous carbon composite powder is preferably 50 weight percent or less, more preferably 25 weight percent or less, further more preferably 15 weight percent or less, and still further more preferably 10 weight percent or less and is also preferably 0.1 weight percent or more, more preferably 0.5 weight percent or more, further more preferably one weight percent or more, and still further more preferably two weight percent or more.

A process for producing the graphite-amorphous carbon composite powder usually include four steps as described below.

First step: The mixture of the graphite material particles and the carbon precursor or the mixture of the graphite material particles, the carbon precursor, and the amorphous material particles is mixed with a solvent using a commercially available mixer, kneader, or another apparatus, whereby a particle-solvent mixture is obtained.

Second step: The particle-solvent mixture is heated while being agitated such that the solvent is removed from the particle-solvent mixture, whereby the intermediate is obtained.

Third step: The particle-solvent mixture or the intermediate is heated to a temperature of 700° C. to 2800° C. in an inert gas atmosphere such as a nitrogen atmosphere, a carbon dioxide atmosphere, or an argon atmosphere, whereby the graphite-amorphous carbon composite is obtained.

Fourth step: The graphite-amorphous carbon composite is subjected to powderization such as pulverization, disintegration, or size classification.

The second and fourth steps may be omitted as required. The fourth step may be performed in advance of the third step.

In the third step, thermal history conditions are important. The lower limit of the heating temperature depends on the type and/or thermal history of the carbon precursor and is preferably 700° C. or more and more preferably 900° C. or more. The upper limit of the heating temperature can be increased to such a degree that graphite grains do not have any structural order higher than crystal structure. Therefore, the upper limit of the heating temperature is preferably 2800° C. or less, more preferably 2000° C. or less, and further more preferably 1500° C. or less. Among such heat treatment conditions, the heating rate, cooling rate, and heating time of the particle-solvent mixture or the intermediate can be arbitrarily set. The particle-solvent mixture or the intermediate may be heat-treated at low temperatures and then heated to a predetermined temperature. A reactor used in this step may be a batch or continuous type. One or more reactors may be used in this step.

The graphite-amorphous carbon composite preferably has crystallinity not higher than that of the graphite material in terms of the peak intensity ratio R determined by Raman spectroscopy, the half width of a peak centered at 1580 $cm^{-1}$, the $d_{002}$ value (the d value (interlayer distance) of a lattice plane (the (002) plane) as determined by X-ray diffractometry) obtained from an X-ray wide-angle diffraction pattern, and the Lc value. That is, the graphite-amorphous carbon composite preferably has an R value greater than or equal to that of the graphite material, a half width $\Delta v$ greater than or equal to that of the graphite material, a $d_{002}$ value greater than or equal to that of the graphite material, and an Lc value less than or equal to that of the graphite material. In particular, the R value of the graphite-amorphous carbon composite is preferably 0.01 to 1.0, more preferably 0.05 to 0.8, further more preferably 0.2 to 0.7, and still further more preferably 0.3 to 0.5 and is preferably greater than or equal to that of the graphite material, which is a parent material.

These carbonaceous materials may contain a negative electrode component capable of occluding and releasing lithium. Examples of the negative electrode component, other than these carbonaceous materials, capable of occluding and releasing lithium include metal oxides such as tin oxide and silicon dioxide; metallic lithium; lithium alloys; and metals, such as Si and Sn, capable of forming an alloy with lithium. These negative electrode components may be used in combination.

An active material for forming the positive electrode of the nonaqueous electrolyte secondary battery is not particularly limited and may be a lithium-transition metal oxide.

Examples of the lithium-transition metal oxide include lithium-cobalt composite oxides such as $LiCoO_2$, lithium-nickel composite oxides such as $LiNiO_2$, and lithium-manganese composite oxides such as $LiMnO_2$. In particular, in view of the improvement of low-temperature discharge properties, the lithium-cobalt composite oxides and the lithium-nickel composite oxides are preferable. These lithium-transition metal oxides can be stabilized in such a manner that a transition metal element in these lithium-transition metal oxides is replaced with a metal species such as Al, Ti, V, Cr, Mn, Fe, Co, Li, Ni, Cu, Zn, Mg, Ga, Zr, or Si. This is preferable. These active materials suitable for the positive electrode may be used in combination.

A technique for preparing the positive or negative electrode is not particularly limited. For example, the positive or negative electrode can be prepared as follows: one of the above active materials is mixed with a binder, a thickening agent, a conductive material, and/or a solvent into a slurry; the slurry is applied onto a current collector substrate; and the current collector substrate is dried. Alternatively, the active material may be roll-formed into a sheet electrode or may be compression-molded into a pellet electrode.

A layer of the positive electrode active material preferably has a thickness of 3 to 1000 μm and more preferably 5 to 200 μm. A layer of the negative electrode active material preferably has a thickness of 1 to 400 μm and more preferably 3 to 200 μm. If layers of the positive or negative electrode active material are provided on both surfaces of each current collector, each active material layer shall has a thickness described above.

The binder is not particularly limited and may be a material that is inert with respect to solvents or electrolyte solutions used for preparing electrodes. Examples of the binder include polyvinylidene fluoride, polytetrafluoroethylene, styrene-butadiene rubber, isoprene rubber, and butadiene rubber. These materials may be used alone or in combination.

Examples of the thickening agent include carboxymethylcellulose, methylcellulose, hydroxymethylcellulose, ethylcellulose, polyvinyl alcohol, oxidized starch, starch phosphate, and casein. These materials may be used alone or in combination.

Examples of the conductive material include metal materials such as copper and nickel and carbonaceous materials such as graphite and carbon black. These materials may be used alone or in combination.

Examples of the solvent include aqueous solvents and organic solvents. Examples of the aqueous solvents include water and alcohols and examples of the organic solvents include N-methylpyrrolidone (NMP) and toluene. These solvents may be used alone or in combination.

Examples of a material for forming a negative electrode current collector are metals such as copper, nickel, and stainless steel. In particular, copper is preferable because it can be readily processed into thin films and its cost is low. Examples of a material for forming a positive electrode current collector are metals such as aluminum, titanium, and tantalum. In particular, aluminum is preferable because it can be readily processed into thin films and its cost is low.

The secondary battery usually includes a separator disposed between the positive electrode and the negative electrode. The shape of the separator used in the secondary battery of the present invention is not particularly limited. A material for forming the separator is not particularly limited and may be selected from materials which are inert with respect to electrolyte solutions and which have good liquid-holding properties. Preferred examples of the material for forming the separator include porous sheets and nonwoven fabric sheets made of a polyolefin such as ethylene or propylene.

A method for manufacturing the nonaqueous electrolyte secondary battery, which comprises the negative electrode, the positive electrode, and the nonaqueous electrolyte solution, is not particularly limited and may be selected from methods usually used.

The battery is not particularly limited in type and may be a cylinder type of battery that includes sheet electrodes and a separator that are spirally wound, a cylinder type of battery that has an inside-out structure in which a separator is combined with pellet electrodes, a coin type of battery that includes pellet or sheet electrodes and a separator laminated therebetween, or a laminate type of battery that includes pellet or sheet electrodes and a separator laminated therebetween.

A method for assembling the battery is not particularly limited and may be selected from various methods usually used depending on the target shape of the battery.

The battery is not particularly limited in shape and may have a cylindrical shape with a bottom, a rectangular shape with a bottom, a thin-film shape, a sheet shape, or a paper shape. Alternatively, the battery may have a complicated shape such as a horseshoe shape or a comb shape such that the battery can be readily incorporated into a system or an apparatus and has high volume efficiency and good storagability. In order to efficiently release heat from the battery, the battery preferably has a rectangular shape with a flat surface having a large area.

When the battery has such a cylindrical shape with a bottom, the battery has a small outer surface area relative to a voltaic cell disposed therein. Hence, the battery is preferably designed such that the Joule heat generated due to the internal resistance during charging or discharging can be efficiently released from the battery. The battery is also preferably designed such that the content of a highly heat-conductive material in the battery is large and therefore the temperature distribution in the battery is uniform.

When the nonaqueous electrolyte solution containing the difluorophosphate according to the present invention is used, the battery preferably has a configuration as described below.

The secondary battery according to the present invention preferably meets at least one of requirements described below and more preferably all of the requirements.

As to the above positive electrode, in view of the enhancement of advantages of the present invention and in particular view of the improvement of output properties, the active material layer of the positive electrode preferably has an area greater than the outer surface area of a cover case of the secondary battery. In particular, the sum of the electrode areas of the positive electrode is 20 times or more and more preferably 40 times or more greater than the surface area of the cover case. This is because the secondary battery has high stability at high temperatures. When the secondary battery has such a rectangular shape with a bottom, the outer surface area of the cover case is defined as the total area calculated from the height, width, and thickness of a portion of the cover case that contains voltaic components other than protruding portions of terminals. When the secondary battery has such a cylindrical shape with a bottom, the outer surface area thereof is defined as the geometric surface area calculated by assuming the cover case portion, which contains voltaic components other than protruding portions of terminals, to be cylindrical in shape. The sum of the electrode areas of the positive electrode is defined as the geometric surface area of a mixture layer which is included in the positive electrode and which is opposed to a mixture layer containing the negative electrode active material. Alternatively, the sum of the electrode areas of the positive electrode is defined as the sum of the areas of both surfaces of a current collector when the current collector is disposed between positive electrode mixture layers.

The positive electrode is preferably designed such that the secondary battery fully charged has a discharge capacity (the electrical capacity of a battery cell housed in a battery case of a secondary battery) of 3 Ah or more to less than 20 Ah and more preferably 4 Ah or more to less than 10 Ah. When the discharge capacity thereof is less than 3 Ah, the secondary battery has low electrical efficiency because the electrode reaction resistance causes a serious voltage drop during the discharge of a large current. When the discharge capacity thereof is greater than 20 Ah, the following problems may occur although the electrode reaction resistance is low and therefore the electrical efficiency is high: a problem that the heat generated in the battery during pulse charging and discharging causes the temperature distribution in the battery to be nonuniform and therefore the battery has low charge-discharge cycle durability, a problem that the heat generated upon the occurrence of troubles such as overcharge and internal short circuits cannot be efficiently released and therefore a phenomenon (valve action) that a gas release valve operates due to an increase in the pressure in the battery occurs or a phenomenon (rupture) that internals are discharged from the battery occurs, and other problems.

An electrode assembly may have one of a layered structure in which the separator is sandwiched between the positive electrode and the negative electrode and a spiral structure in which the positive electrode, separator, and negative electrode arranged in that order are wound.

The percentage (hereinafter referred to as the electrode assembly occupancy percentage) of the volume of the electrode assembly in the internal volume of the battery is preferably 40-90% and more preferably 50-80%. When the electrode assembly occupancy percentage is less than 40%, the battery has low capacity. When the electrode assembly occupancy percentage is greater than 90%, the battery has only a small empty space and therefore the following problems may occur: problems that charge-discharge cycle properties and high-temperature storage properties of the battery are deteriorated and/or a gas release valve for reducing the pressure in the battery operates because members of the battery are expanded and the vapor pressure of each component of the electrolyte solution is increased when the battery is heated to high temperature.

In order to enhance advantages of the present invention, the current collectors need to have such a structure that wires and contacts have low resistance. When such internals have high resistance, advantages of the nonaqueous electrolyte solution according to the present invention cannot be achieved sufficiently.

When the electrode assembly has the above layered structure, metal core portions of each electrode layer preferably are bundled and then soldered to a terminal.

When one of the electrodes has a large area, the battery has a large internal resistance; hence, a plurality of terminals are preferably provided in the electrode such that the internal resistance is reduced.

When the electrode assembly has the above spiral structure, a plurality of leads are preferably connected to each of the positive negative electrodes and then wound around terminals, whereby the internal resistance can be reduced.

The internal resistance can be minimized by optimizing the layered or spiral structure. The battery, which is charged with a large current, preferably has an impedance (hereinafter referred to as a direct current resistance) of less than ten milliohms as determined by a 10-kHz direct current method. The battery more preferably has a direct current resistance of less than five milliohms and further more preferably less than two milliohms. When the direct current resistance of the battery is 0.1 milliohms or less, the battery has increased high-output properties; however, the percentage of a current collector material in the battery is high and therefore the battery has a reduced capacity.

EXAMPLES

The present invention will now be further described in detail with reference to examples. The present invention is not limited to the examples within the scope of the present invention.

(Production of Difluorophosphate)

Example 1

In an Ar atmosphere dry box, 303.8 mg (0.002 mol) of $LiPF_6$ (an average particle size of 150 μm) was placed in a first vessel and a second vessel slightly smaller than the first vessel was then placed in the first vessel. The second vessel contained 147.8 mg (0.002 mol) of $Li_2CO_3$ (an average particle size of 12 μm) and had an open upper portion. In this state, although $LiPF_6$ and $Li_2CO_3$ were not in contact with each other, the vapors thereof were capable of freely flowing between the first and second vessels through the open upper portion. The first vessel was hermetically sealed and then maintained at 60° C. for 168 hours (an initial pressure of 0.1 MPa).

The first and second vessels were cooled to room temperature. The contents of the second vessel were analyzed by ion chromatography, whereby 0.00085 mol of $PO_2F_2$ anions (difluorophosphate anions) were detected (a yield of 85%).

The first and second vessels were made of a perfluoroalkoxy fluorocarbon resin.

The content (weight percent) of each component in the reaction product was determined in such a manner that the weight of a metal element was subtracted from that of the reaction product. The content thereof was as follows:

| | |
|---|---|
| $PO_2F_2$: | 56.3% |
| F: | 32.1% |
| $PF_6$: | 0.5% |
| $CO_3$: | 10.5% |
| $PO_3F$: | 0.3% |
| $PO_4$: | 0.3% |

Example 2

An experiment was performed in substantially the same manner as that described in Example 1 except that $LiBO_2$ (lithium metaborate) (an average particle size of 30 μm) was placed in the second vessel instead of $Li_2CO_3$, whereby 0.00026 mol of $PO_2F_2$ anions (difluorophosphate anions) were detected from the contents of the second vessel (a yield of 13%).

Example 3

An experiment was performed in substantially the same manner as that described in Example 1 except that $K_2CO_3$ (potassium carbonate) (an average particle size of 25 μm) was placed in the second vessel instead of $Li_2CO_3$, whereby 0.00003 mol of PO$_2$F$_2$ anions (difluorophosphate anions) were detected from the contents of the second vessel (a yield of 1.5%).

Example 4

In an Ar atmosphere dry box, 18.23 g (0.12 mol) of LiPF$_6$ (an average particle size of 150 μm) and 14.78 g (0.2 mol) of Li$_2$CO$_3$ (an average particle size of 12 μm) were placed in a vessel made of stainless steel and were then mixed. In this state, the vessel was hermetically sealed and then maintained at 60° C. for 168 hours (an initial pressure of 0.1 MPa).

The vessel was cooled to room temperature. The contents (reaction product) of the vessel were analyzed by ion chromatography, whereby 0.099 mol of PO$_2$F$_2$ anions (difluorophosphate anions) were detected (a yield of 99%).

The content (weight percent) of each component in the reaction product was determined in such a manner that the weight of a metal element was subtracted from that of the reaction product. The content thereof was as follows:

| | |
|---|---|
| PO$_2$F$_2$: | 48.5% |
| F: | 36.5% |
| PF$_6$: | 13.6% |
| CO$_3$: | 0.9% |
| PO$_3$F: | 0.3% |
| PO$_4$: | 0.2% |

As is clear from the above results, in Examples 1 to 3, gaseous PF$_5$ generated by the thermal decomposition of LiPF$_6$ react with each carbonate or the borate to produce the difluorophosphate. In particular, lithium carbonate has extremely high reaction efficiency. When LiPF$_6$, which is solid, is used as a source for generating a P/F-containing gas, a technique in which LiPF$_6$ is mixed with the source salt in advance as described in Example 4 is superior in reaction efficiency to a technique in which LiPF$_6$ is separated from the source salt as described in Example 1.

(Production of Nonaqueous Electrolyte Solution for Secondary Batteries and Manufacture of Nonaqueous Electrolyte Secondary Battery)

A positive electrode, a negative electrode, and a nonaqueous electrolyte solution were prepared by a procedure described below and a nonaqueous electrolyte secondary battery was manufactured and then evaluated.

Example 5

Preparation of Positive Electrode

In N-methylpyrrolidone serving as a solvent, 90 weight percent of lithium nickelate (LiNiO$_2$) serving as a positive electrode active material, five weight percent of acetylene black serving as a conductive material, and five weight percent of polyvinylidene difluoride (PVdF) serving as a binder were mixed, whereby a slurry was prepared. The slurry was applied onto both surfaces of an aluminum sheet, serving as a positive electrode body, having a thickness of 20 μm. The resulting aluminum sheet was dried, pressed to a thickness of 80 μm with a press, and then cut, whereby a positive electrode having a width of 52 mm and a length of 830 mm was prepared. The upper and lower surfaces of the positive electrode each had an uncoated portion with a length of 50 mm and an active material layer with a length of 780 mm.

Preparation of Negative Electrode

The following dispersions were added to 98 parts by weight of the artificial graphite powder KS-44 (a product made by Timcal): 100 parts by weight of an aqueous dispersion (a sodium carboxymethylcellulose concentration of one weight percent) of sodium carboxymethylcellulose and two parts by weight of an aqueous dispersion (a styrene-butadiene rubber concentration of 50 weight percent) of styrene-butadiene rubber. The artificial graphite powder KS-44 had a d value of 0.336 nm as determined by analyzing a lattice plane (the (002) plane) thereof by X-ray diffractometry, a crystallite size (Lc) of 100 nm or more (264 nm) as determined by X-ray diffractometry, an ash content of 0.04 weight percent, a median diameter of 17 μm as determined by a laser diffraction/scattering method, a specific surface area of 8.9 m$^2$/g as determined by the BET method, a peak P$_A$ (peak intensity I$_A$) ranging from 1580 to 1620 cm$^{-1}$, and a peak P$_B$ (peak intensity I$_B$) ranging from 1350 to 1370 cm$^{-1}$ as determined by Raman spectroscopy using an argon laser beam. The intensity ratio of the 1350-1370 cm$^{-1}$ peak to the 1580-1620 cm$^{-1}$ peak was 0.15 as calculated using the equation R=I$_B$/I$_A$. The 1580-1620 cm$^{-1}$ peak had a half width of 22.2 cm$^{-1}$. The mixture was kneaded with a disperser, whereby a slurry was prepared. The slurry was uniformly applied onto both surfaces of a copper sheet, serving as a negative electrode current collector, having a thickness of 18 μm. The resulting copper sheet was dried, pressed to a thickness of 85 μm with a press, and then cut, whereby a negative electrode having a width of 56 mm and a length of 850 mm was prepared. The upper and lower surfaces of the negative electrode each had an uncoated portion with a length of 30 mm and an active material layer with a length of 820 mm.

Preparation of Electrolyte Solution

In a dry argon atmosphere ethylene carbonate (EC), dimethyl carbonate (DMC), and diethyl carbonate (DEC), which were refined, were mixed at a ratio of 3:3:4 on a volume basis. Sufficiently dry lithium hexafluorophosphate (LiPF$_6$) was dissolved in the solvent mixture, whereby a 1 mol/L solution was prepared. In 1 kg of the solution, 12.15 g of the reaction product obtained in Example 4 was dissolved. The reaction product solution was filtered, whereby a nonaqueous electrolyte solution was prepared.

The concentration of a fluoride in the nonaqueous electrolyte solution was 0.02 mol/kg, the concentration of a difluorophosphate (lithium difluorophosphate) therein was 0.051 mol/kg, and no lithium carbonate was detected from the nonaqueous electrolyte solution.

Assembly of Battery

The positive electrode and the negative electrode were wound in such a manner that a separator prepared from a porous polyethylene sheet was sandwiched between the positive electrode and the negative electrode, whereby an electrode assembly was prepared. The electrode assembly was sealed in a battery can. Into the battery can containing the electrode assembly, 5 mL of the nonaqueous electrolyte solution was injected such that the nonaqueous electrolyte solution sufficiently penetrated the electrodes. The resulting battery can was caulked, whereby a 18650-type cylindrical battery was prepared.

Evaluation of Battery

A new battery not subjected to any actual charge-discharge cycle was subjected to five initial charge-discharge cycles at 25° C. The 0.2 C discharge capacity of the battery subjected to the fifth cycle was defined as the initial discharge capacity (the current needed to discharge the nominal capacity, corresponding to the one-hour-rate discharge capacity, in one hour being defined as 1 C and the same applies to the followings).

The battery was subjected to a cycle test at a high temperature of 60° C. that is considered to be the upper limit of the temperature at which lithium secondary batteries can be used. The battery was charged to a charge cut-off voltage of 4.1 V by a 2 C constant-current constant-voltage method and then discharged to a discharge cut-off voltage of 3.0 V at a 2 C constant current in each charge-discharge cycle. This cycle was repeated 500 times.

The battery subjected to the above cycle test was further subjected to three charge-discharge cycles at 25° C. The 0.2 C discharge capacity of the battery subjected to the third cycle was defined as the last discharge capacity. The initial discharge capacity and the last discharge capacity are shown in Table 1.

Comparative Example 1

A battery was prepared in substantially the same manner as that described in Example 5 except that the reaction product obtained Example 4 was not used to prepare an electrolyte solution. The battery was evaluated in the same manner as described above. The evaluation results are shown in Table 1.

Example 6

The following materials were mixed: 2 kg of the artificial graphite powder KS-44 (a product made by Timcal) and 1 kg of petroleum pitch. The mixture, which was slurry, was heated to 1100° C. over two hours and then maintained for two hours in an inert atmosphere in a batch furnace. The resulting mixture was pulverized into particles, which were sieved with a vibrating sieve, whereby particles having a size of 18-22 μm were obtained. Finally, an amorphous carbon-coated graphite-based carbonaceous material containing graphite particles coated with seven weight percent of amorphous carbon was obtained.

The amorphous carbon-coated graphite-based carbonaceous material was used as a negative electrode active material. The following dispersions were added to 98 parts by weight of the amorphous carbon-coated graphite-based carbonaceous material: 100 parts by weight of an aqueous dispersion (a sodium carboxymethylcellulose concentration of one weight percent) of sodium carboxymethylcellulose and two parts by weight of an aqueous dispersion (a styrene-butadiene rubber concentration of 50 weight percent) of styrene-butadiene rubber. The mixture was kneaded with a disperser, whereby a slurry was prepared. The slurry was uniformly applied onto both surfaces of a copper sheet having a thickness of 18 μm. The resulting copper sheet was dried and then pressed with a press. The resulting copper sheet was cut into a rectangular piece having a width of 54 mm and a length of 880 mm, whereby a negative electrode was prepared.

A battery was prepared in substantially the same manner as that described in Example 5 except that the negative electrode was prepared as described above. The battery was evaluated in the same manner as that described in Example 5. The evaluation results are shown in Table 1.

Comparative Example 2

A battery was prepared in substantially the same manner as that described in Comparative Example 1 except that a negative electrode was prepared in the same manner as that described in Example 6. The battery was evaluated in the same manner as described above. The evaluation results are shown in Table 1.

TABLE 1

|  | Initial discharge capacity (mAh) | Last discharge capacity (mAh) |
|---|---|---|
| Example 5 | 700 | 622 |
| Comparative Example 1 | 700 | 596 |
| Example 6 | 702 | 636 |
| Comparative Example 2 | 702 | 615 |

As is clear from Table 1, the secondary batteries containing the nonaqueous electrolyte solution, produced by the producing method of the present invention, containing the difluorophosphate have extremely improved high-temperature cycle properties.

Example 7

Preparation of Positive Electrode

In N-methylpyrrolidone serving as a solvent, 90 weight percent of lithium nickelate ($LiNiO_2$) serving as a positive electrode active material, five weight percent of acetylene black serving as a conductive material, and five weight percent of polyvinylidene difluoride (PVdF) serving as a binder were mixed, whereby a slurry was prepared. The slurry was applied onto a surface of an aluminum sheet, serving as a positive electrode body, having a thickness of 20 μm. The resulting aluminum sheet was dried, pressed to a thickness of 80 μm with a press, and then punched with a punch, whereby a positive electrode with a diameter of 12.5 mm was prepared.

Preparation of Negative Electrode

The following dispersions were added to 98 parts by weight of the artificial graphite powder KS-44 (a product made by Timcal): 100 parts by weight of an aqueous dispersion (a sodium carboxymethylcellulose concentration of one weight percent) of sodium carboxymethylcellulose and two parts by weight of an aqueous dispersion (a styrene-butadiene rubber concentration of 50 weight percent) of styrene-butadiene rubber. The mixture was kneaded with a disperser, whereby a slurry was prepared. The slurry was uniformly applied onto a surface of a copper sheet, serving as a negative electrode current collector, having a thickness of 18 μm. The resulting copper sheet was dried, pressed to a thickness of 85 μm with a press, and then punched with a punch, whereby a negative electrode with a diameter of 12.5 mm was prepared.

Preparation of Electrolyte Solution

Ethylene carbonate (EC), dimethyl carbonate (DMC), and diethyl carbonate (DEC) were refined in a dry argon atmosphere and then mixed at a ratio of 2:4:4 on a volume basis. Sufficiently dry lithium hexafluorophosphate ($LiPF_6$) was dissolved in the solvent mixture, whereby a 1 mol/L solution was prepared. In 1 kg of the solution, 6.07 g of the reaction product obtained in Example 4 was dissolved. The reaction product solution was filtered, whereby a nonaqueous electrolyte solution was prepared. The nonaqueous electrolyte solution had a $PO_2F_2$ anion concentration of 0.025 mol/kg as determined by ion chromatography.

Assembly of Battery

The positive electrode, the negative electrode, and a separator, prepared from a porous polyethylene sheet, having a diameter of 14 mm were placed in a battery can in such a manner that the separator was sandwiched between the positive electrode and the negative electrode. The nonaqueous electrolyte solution was introduced dropwise into the battery can. The resulting battery can was caulked, whereby a 2032-type coin battery was prepared.

Evaluation of Battery

A new battery not subjected to any actual charge-discharge cycle was subjected to three initial charge-discharge cycles (3.0-4.1 V) at 25° C. The quotient obtained by dividing the 0.2 C discharge capacity of the battery subjected to the third cycle by the weight of the positive electrode active material was defined as the room-temperature discharge capacity.

The resulting battery was subjected to a discharge test at a low temperature of −30° C. The coin battery untested was charged to a charge cut-off voltage of 4.1 V by a constant-current constant-voltage method at 25° C. and then discharged to a discharge cut-off voltage of 3.0 V at a rate of 0.2 C at low temperature. The quotient obtained by dividing the discharge capacity, determined in this manner, by the weight of the positive electrode active material was defined as the low-temperature discharge capacity. These results are shown in Table 2.

Example 8

A battery was prepared in substantially the same manner as that described in Example 7 except that an electrolyte solution was prepared using the following mixture as a nonaqueous solvent: a solvent mixture prepared by mixing ethylene carbonate (EC), dimethyl carbonate (DMC), and ethyl methyl carbonate (EMC) at a ratio of 2:4:4 on a volume basis. The battery was evaluated in the same manner as that described in Example 7. The evaluation results are shown in Table 2. The electrolyte solution had a $PO_2F_2$ anion concentration of 0.025 mol/kg as determined by ion chromatography.

Comparative Example 3

A battery was prepared in substantially the same manner as that described in Example 7 except that the reaction product obtained Example 4 was not used to prepare an electrolyte solution. The battery was evaluated in the same manner as described above. The evaluation results are shown in Table 2. The electrolyte solution contained no $PO_2F_2$ anion.

Comparative Example 4

A battery was prepared in substantially the same manner as that described in Example 8 except that the reaction product obtained Example 4 was not used to prepare an electrolyte solution. The battery was evaluated in the same manner as described above. The evaluation results are shown in Table 2. The electrolyte solution contained no $PO_2F_2$ anion.

Example 9

A battery was prepared in substantially the same manner as that described in Example 7 except that an electrolyte solution was prepared using the following mixture as a nonaqueous solvent: a solvent mixture prepared by mixing ethylene carbonate (EC) and diethyl carbonate (DEC) at a ratio of 2:8 on a volume basis. The battery was evaluated in the same manner as that described in Example 7. The evaluation results are shown in Table 2. The electrolyte solution had a $PO_2F_2$ anion concentration of 0.025 mol/kg as determined by ion chromatography.

Comparative Example 5

A battery was prepared in substantially the same manner as that described in Example 9 except that the reaction product obtained Example 4 was not used to prepare an electrolyte solution. The battery was evaluated in the same manner as described above. The evaluation results are shown in Table 2. The electrolyte solution contained no $PO_2F_2$ anion.

Table 2 also shows the percentage of increase in low-temperature discharge capacity due to the presence of the difluorophosphate, the percentage being obtained in comparison between Example 7 and Comparative Example 3, between Example 8 and Comparative Example 4, or between Example 9 and Comparative Example 5.

TABLE 2

| | Nonaqueous solvent | Room-temperature discharge capacity (mAh/g) | Low-temperature discharge capacity (mAh/g) | Percentage of increase in low-temperature discharge capacity due to presence of difluoro-phosphate |
|---|---|---|---|---|
| Example 7 | ECDMCDEC | 156.8 | 80.1 | 52.6% greater than Comparative Example 3 |
| Example 8 | ECDMCEMC | 156.8 | 79.5 | 48.9% greater than Comparative Example 4 |
| Example 9 | ECDEC | 156.6 | 62.8 | 36.5% greater than Comparative Example 5 |
| Comparative Example 3 | ECDMCDEC | 156.8 | 52.5 | |
| Compartitive Example 4 | ECDMCEMC | 156.6 | 53.4 | |
| Comparative Example 5 | ECDEC | 156.7 | 46.0 | |

As is clear from Table 2, the electrolyte solutions containing the difluorophosphate have good low-temperature discharge properties. The electrolyte solutions of Examples 7 and 8 that each contain three types of solvents are superior to the electrolyte solution of Example 9 that contains two types of solvents in respect of the absolute value of the low-temperature discharge capacity and the percentage of increase in low-temperature discharge capacity due to the presence of the difluorophosphate.

Example 10

Preparation of Positive Electrodes

In N-methylpyrrolidone serving as a solvent, 90 weight percent of lithium nickelate ($LiNiO_2$) serving as a positive electrode active material, five weight percent of acetylene black serving as a conductive material, and five weight percent of polyvinylidene difluoride (PVdF) serving as a binder were mixed, whereby a slurry was prepared. The slurry was applied onto both surfaces of an aluminum sheet having a thickness of 15 μm. The resulting aluminum sheet was dried, pressed to a thickness of 80 μm with a press, and then cut into pieces, which were processed into positive electrodes. The positive electrodes had active material layers having a width of 100 mm and a length of 100 mm and uncoated portions with a width of 30 mm.

Preparation of Negative Electrode

The following dispersions were added to 98 parts by weight of the artificial graphite powder KS-44 (a product made by Timcal): 100 parts by weight of an aqueous dispersion (a sodium carboxymethylcellulose concentration of one weight percent) of sodium carboxymethylcellulose serving as a thickening agent and two parts by weight of an aqueous dispersion (a styrene-butadiene rubber concentration of 50 weight percent) of styrene-butadiene rubber serving as a binder. The mixture was kneaded with a disperser, whereby a slurry was prepared. The slurry was uniformly applied onto both surfaces of a copper sheet having a thickness of 10 μm. The resulting copper sheet was dried, pressed to a thickness of 75 μm with a press, and then cut into pieces, which were processed into negative electrodes. The negative electrodes had active material layers having a width of 104 mm and a length of 104 mm and uncoated portions with a width of 30 mm.

Preparation of Electrolyte Solution

An electrolyte solution was prepared in the same manner as that described in Example 5.

Assembly of Battery

Thirty two of the positive electrode and thirty three of the negative electrodes were alternately stacked such that separators (a thickness of 25 μm) prepared from a porous polyethylene sheet were each disposed between the positive and negative electrodes. In this operation, the positive electrode active material layers were arranged to be each opposed to the corresponding negative electrode active material layers. The uncoated portions of the positive electrodes were each soldered to the corresponding uncoated portions of the negative electrodes such that current collector tabs were formed, whereby an electrode assembly was preparaed. The electrode assembly was sealed in a battery can (a size of 120×110×10 mm). Into the battery can containing the electrode assembly, 20 mL of the electrolyte solution was injected such that the electrolyte solution sufficiently penetrated the electrodes. The battery can was hermetically sealed, whereby a battery was prepared.

Evaluation of Battery

A new battery not subjected to any actual charge-discharge cycle was subjected to five initial charge-discharge cycles at 25° C. The 0.2 C discharge capacity of the battery subjected to the fifth cycle was defined as the initial discharge capacity.

The resulting battery was subjected to a pulse power test. As first, charged for 150 minutes at 25° C. with a 0.2 C constant current, and then discharged at a rate of 0.1 C, 0.3 C, 1.0 C, 3.0 C, and then 10.0 C each for ten seconds. The battery discharged at each rate for ten seconds was measured for voltage. The area of a triangle surrounded by a current-voltage line and a lower limit voltage (3 V) line was defined as the output (W). These results are shown in Table 3.

Comparative Example 6

A battery was prepared in substantially the same manner as that described in Example 10 except that an electrolyte solution was prepared in the same manner as that described in Comparative Example 1. The battery was evaluated in the same manner as that described in Example 10. The evaluation results are shown in Table 3.

Example 11

A battery was prepared in the same manner as that described in Example 5 and then evaluated in the same manner as that described in Example 10. The evaluation results are shown in Table 3.

Comparative Example 7

A battery was prepared in the same manner as that described in Comparative Example 1 and then evaluated in the same manner as that described in Example 10. The evaluation results are shown in Table 3.

Table 3 also shows the percentage of increase in output, the percentage being obtained in comparison between Example 10 and Comparative Example 6 or between Example 11 and Comparative Example 7. Table 3 also shows the impedance (direct current resistance) of each battery as determined by a 10 kHz alternating current method.

TABLE 3

| | Initial discharge capacity (mAh) | Output (W) | Percentage of increase in output | Direct current resistance |
|---|---|---|---|---|
| Example 10 | 6004 | 502 | 18.4% greater than Comparative Example 6 | 5 mΩ |
| Comparative Example 6 | 6005 | 424 | | 5 mΩ |
| Example 11 | 700 | 45 | 12.5% greater than Comparative Example 7 | 35 mΩ |
| Comparative Example 7 | 700 | 40 | | 35 mΩ |

As is clear from Table 3, the electrolyte solutions containing the difluorophosphate have good output properties. Example 10 is superior to Example 11 having lower capacity and higher resistance in respect of the percentage of increase in output.

INDUSTRIAL APPLICABILITY

A difluorophosphate according to the present invention is industrially useful as a stabilizer for polychloroethylene and additives for nonaqueous electrolyte solutions for lithium batteries. In particular, a nonaqueous electrolyte solution and nonaqueous electrolyte secondary battery having high performance can be produced using the difluorophosphate that can be produced by a method according to the present invention.

This application is based on Japanese Patent Application (No. 2004-304487) filed on Oct. 19, 2004 and the disclosure of which is incorporated herein by reference. The disclosures of the documents cited herein are also incorporated herein by reference.

The invention claimed is:

1. A nonaqueous electrolyte solution comprising a nonaqueous solvent, a hexafluorophosphate, difluorophosphate, and fluoride dissolved therein.

2. The nonaqueous electrolyte solution according to claim 1, wherein the difluorophosphate is produced by a method comprising bringing a source gas into contact with a source material comprising at least one component selected from the group consisting of a carbonate and a borate,
   wherein the source gas comprises a phosphorus compound consisting of P and F and/or a phosphorus compound consisting of P, F, and O.

3. The nonaqueous electrolyte according to claim 2, wherein the phosphorus compound is at least one phosphorus compound selected from the group consisting of $PF_5$ and $POF_3$.

4. A nonaqueous electrolyte secondary battery comprising the nonaqueous electrolyte solution according to claim 1, a negative electrode, and a positive electrode.

5. A nonaqueous electrolyte secondary battery comprising the nonaqueous electrolyte solution according to claim 1, a negative electrode, and a positive electrode, wherein at least one of the following conditions is satisfied:
  (i) the sum of the electrode areas of the positive electrode is 20 times or more greater than the surface area of a cover of the secondary battery;
  (ii) the secondary battery has a direct current resistance of less than ten milliohms (m$\Omega$); and
  (iii) the electrical capacity of a battery cell housed in a battery cover of the secondary battery is three ampere-hours (Ah) or more.

6. A nonaqueous electrolyte secondary battery comprising the nonaqueous electrolyte solution according to claim 1, a negative electrode that conducts lithium ions, and a positive electrode.

7. A nonaqueous electrolyte secondary battery comprising the nonaqueous electrolyte solution according to claim 1, a negative electrode that conducts lithium ions, and a positive electrode, wherein at least one of the following conditions is satisfied:
  (i) the sum of the electrode areas of the positive electrode is 20 times or more greater than the surface area of a cover of the secondary battery;
  (ii) the secondary battery has a direct current resistance of less than ten milliohms (m$\Omega$); and
  (iii) the electrical capacity of a battery cell housed in a battery cover of the secondary battery is three ampere-hours (Ah) or more.

8. A nonaqueous electrolyte solution comprising a nonaqueous solvent, a hexafluorophosphate, difluorophosphate, and carbon dioxide dissolved therein.

9. The nonaqueous electrolyte solution according to claim 8, wherein the difluorophosphate is produced by a method comprising bringing a source gas into contact with a source material comprising at least one component selected from the group consisting of a carbonate and a borate,
  wherein the source gas comprises a phosphorus compound consisting of P and F and/or a phosphorus compound consisting of P, F, and O.

10. The nonaqueous electrolyte according to claim 9, wherein the phosphorus compound is at least one phosphorus compound selected from the group consisting of $PF_5$ and $POF_3$.

11. A nonaqueous electrolyte secondary battery comprising the nonaqueous electrolyte solution according to claim 8, a negative electrode, and a positive electrode.

12. A nonaqueous electrolyte secondary battery comprising the nonaqueous electrolyte solution according to claim 8, a negative electrode, and a positive electrode, wherein at least one of the following conditions is satisfied:
  (i) the sum of the electrode areas of the positive electrode is 20 times or more greater than the surface area of a cover of the secondary battery;
  (ii) the secondary battery has a direct current resistance of less than ten milliohms (m$\Omega$); and
  (iii) the electrical capacity of a battery cell housed in a battery cover of the secondary battery is three ampere-hours (Ah) or more.

13. The nonaqueous electrolyte solution according to claim 8, wherein the difluorophosphate is produced by a method comprising mixing $LiPF_6$ with a source material comprising at least one component selected from the group consisting of a carbonate and a borate, and then heating the mixture.

14. A nonaqueous electrolyte secondary battery comprising the nonaqueous electrolyte solution according to claim 8, a negative electrode that conducts lithium ions, and a positive electrode.

15. A nonaqueous electrolyte secondary battery comprising the nonaqueous electrolyte solution according to claim 8, a negative electrode that conducts lithium ions, and a positive electrode, wherein at least one of the following conditions is satisfied:
  (i) the sum of the electrode areas of the positive electrode is 20 times or more greater than the surface area of a cover of the secondary battery;
  (ii) the secondary battery has a direct current resistance of less than ten milliohms (m$\Omega$); and
  (iii) the electrical capacity of a battery cell housed in a battery cover of the secondary battery is three ampere-hours (Ah) or more.

16. A nonaqueous electrolyte solution comprising a nonaqueous solvent, a hexafluorophosphate, and lithium difluorophosphate dissolved therein, wherein the nonaqueous solvent comprises a cyclic carbonate and a linear carbonate, and wherein a $PO_3F$ content and $PO_4$ content are less than or equal to one weight percent of the non-metal component weight, and wherein the nonaqueous electrolyte solution comprises at least one further component selected from the group consisting of fluoride and carbon dioxide.

17. The nonaqueous electrolyte solution according to claim 16, wherein the cyclic carbonate is at least one carbonate selected from the group consisting of ethylene carbonate, propylene carbonate, and butylene carbonate and the linear carbonate is at least one carbonate selected from the group consisting of dimethyl carbonate, diethyl carbonate, and ethyl methyl carbonate.

18. The nonaqueous electrolyte solution according to claim 16, wherein the nonaqueous solvent comprises ethylene carbonate, dimethyl carbonate, and diethyl carbonate.

19. The nonaqueous electrolyte solution according to claim 16, wherein the nonaqueous solvent comprises ethylene carbonate, dimethyl carbonate, and ethyl methyl carbonate.

20. The nonaqueous electrolyte solution according to claim 1, wherein the difluorophosphate is produced by a method comprising mixing $LiPF_6$ with a source material comprising at least one component selected from the group consisting of a carbonate and a borate, and then heating the mixture.

21. The nonaqueous electrolyte solution according to claim 16, wherein the nonaqueous solvent is a solvent mixture of three or more nonaqueous solvent components.

22. A nonaqueous electrolyte secondary battery comprising the nonaqueous electrolyte solution according to claim 16, a negative electrode that conducts lithium ions, and a positive electrode.

23. A nonaqueous electrolyte secondary battery comprising the nonaqueous electrolyte solution according to claim 16, a negative electrode that conducts lithium ions, and a positive electrode, wherein at least one of the following conditions is satisfied:
  (i) the sum of the electrode areas of the positive electrode is 20 times or more greater than the surface area of a cover of the secondary battery;
  (ii) the secondary battery has a direct current resistance of less than ten milliohms (m$\Omega$); and
  (iii) the electrical capacity of a battery cell housed in a battery cover of the secondary battery is three ampere-hours (Ah) or more.

* * * * *